United States Patent
Lang

(10) Patent No.: US 9,820,039 B2
(45) Date of Patent: Nov. 14, 2017

(54) DEFAULT PLAYBACK DEVICES

(71) Applicant: SONOS, INC., Santa Barbara, CA (US)

(72) Inventor: Jonathan P. Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/098,892

(22) Filed: Apr. 14, 2016

(65) Prior Publication Data

US 2017/0245051 A1    Aug. 24, 2017

Related U.S. Application Data

(60) Provisional application No. 62/298,410, filed on Feb. 22, 2016, provisional application No. 62/298,418, (Continued)

(51) Int. Cl.
*H04B 3/00* (2006.01)
*H04R 3/00* (2006.01)
(Continued)

(52) U.S. Cl.
CPC ............ *H04R 3/00* (2013.01); *G06F 3/165* (2013.01); *G06F 3/167* (2013.01); *H04R 27/00* (2013.01); *H04R 2227/005* (2013.01)

(58) Field of Classification Search
CPC ........ H04R 2227/003; H04R 2227/005; H04R 27/00; H04R 29/001; H04R 29/004; H04R 29/007; H04R 29/008; G10L 21/00; H04L 65/60; H04L 65/608; H04L 67/025; H04M 1/6083; H04M 1/72558; H04S 7/303; H04W 12/02; H04W 4/22; H04W 76/007; H04W 76/02; H04W 4/005; H04W 76/025; H04W 84/18; H04W 8/005
(Continued)

(56) References Cited

U.S. PATENT DOCUMENTS 4,941,187 A   7/1990 Slater
5,440,644 A   8/1995 Farinelli et al.
(Continued)

FOREIGN PATENT DOCUMENTS

AU   2017100581 A4   6/2017
EP   1349146 A1   10/2003
(Continued)

OTHER PUBLICATIONS

US 9,299,346, 03/2016, Hart et al. (withdrawn)
(Continued)

*Primary Examiner* — Lun-See Lao

(57) ABSTRACT

Systems and method discussed herein involve applying a designation of a default playback device in a media playback system. One method may involve maintaining a database comprising data indicating an assignment of an identification of a network microphone device to a playback zone of a media playback system, receiving a message indicating (i) the identification of the network microphone device and (ii) a media playback command, identifying the playback zone in the media playback system based on the data in the database and the received message, and transmitting to the playback zone, a message indicating the media playback command.

20 Claims, 8 Drawing Sheets

Related U.S. Application Data filed on Feb. 22, 2016, provisional application No. 62/298,433, filed on Feb. 22, 2016, provisional application No. 62/298,439, filed on Feb. 22, 2016, provisional application No. 62/298,425, filed on Feb. 22, 2016, provisional application No. 62/298,350, filed on Feb. 22, 2016, provisional application No. 62/298,388, filed on Feb. 22, 2016, provisional application No. 62/298,393, filed on Feb. 22, 2016, provisional application No. 62/312,350, filed on Mar. 23, 2016.

(51) Int. Cl.
*G06F 3/16* (2006.01)
*H04R 27/00* (2006.01)

(58) Field of Classification Search
USPC ... 381/92, 56–59, 314, 300, 303, 61, 77, 96; 700/94; 715/736, 716; 370/338; 455/414.3
See application file for complete search history.

(56) References Cited

U.S. PATENT DOCUMENTS

| | | |
|---|---|---|
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,255,224 B2 | 8/2012 | Singleton et al. |
| 8,364,481 B2 | 1/2013 | Strope et al. |
| 8,423,893 B2 * | 4/2013 | Ramsay ............. G06F 3/0486 715/716 |
| 8,483,853 B1 | 7/2013 | Lambourne |
| 8,484,025 B1 | 7/2013 | Moreno et al. |
| 8,831,957 B2 | 9/2014 | Taubman et al. |
| 8,938,394 B1 | 1/2015 | Faaborg et al. |
| 8,983,844 B1 | 3/2015 | Thomas et al. |
| 9,215,545 B2 | 12/2015 | Dublin et al. |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,431,021 B1 * | 8/2016 | Scalise ............... G10L 21/00 |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,552,816 B2 | 1/2017 | Vanlund et al. |
| 9,560,441 B1 | 1/2017 | McDonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,704,478 B1 | 7/2017 | Vitaladevuni et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2006/0147058 A1 | 7/2006 | Wang |
| 2007/0018844 A1 | 1/2007 | Sutardja |
| 2007/0142944 A1 | 6/2007 | Goldberg et al. |
| 2009/0005893 A1 | 1/2009 | Sugii et al. |
| 2010/0023638 A1 | 1/2010 | Bowman |
| 2010/0179874 A1 | 7/2010 | Higgins et al. |
| 2011/0280422 A1 | 11/2011 | Neumeyer et al. |
| 2012/0297284 A1 | 11/2012 | Matthews, III et al. |
| 2013/0183944 A1 | 7/2013 | Mozer et al. |
| 2013/0317635 A1 | 11/2013 | Bates et al. |
| 2013/0329896 A1 * | 12/2013 | Krishnaswamy .... H04R 29/005 381/58 |
| 2013/0343567 A1 | 12/2013 | Triplett et al. |
| 2014/0006026 A1 | 1/2014 | Lamb et al. |
| 2014/0075306 A1 | 3/2014 | Rega |
| 2014/0094151 A1 * | 4/2014 | Klappert ............ H04M 1/6083 455/414.1 |
| 2014/0100854 A1 * | 4/2014 | Chen ..................... H04L 12/282 704/275 |
| 2014/0167931 A1 | 6/2014 | Lee et al. |
| 2014/0363022 A1 | 12/2014 | Dizon et al. |
| 2015/0154976 A1 | 6/2015 | Mutagi |
| 2015/0280676 A1 | 10/2015 | Holman et al. |
| 2015/0302856 A1 | 10/2015 | Kim et al. |
| 2015/0341406 A1 | 11/2015 | Rockefeller et al. |
| 2015/0363061 A1 | 12/2015 | De Nigris, III et al. |
| 2015/0363401 A1 | 12/2015 | Chen et al. |
| 2016/0007116 A1 | 1/2016 | Holman |
| 2016/0021458 A1 | 1/2016 | Johnson et al. |
| 2016/0029142 A1 | 1/2016 | Isaac |
| 2016/0036962 A1 | 2/2016 | Rand et al. |
| 2016/0042748 A1 | 2/2016 | Jain et al. |
| 2016/0057522 A1 | 2/2016 | Choisel et al. |
| 2016/0098393 A1 | 4/2016 | Hebert |
| 2016/0173578 A1 | 6/2016 | Sharma et al. |
| 2016/0239255 A1 | 8/2016 | Chavez et al. |
| 2016/0314782 A1 | 10/2016 | Klimanis |
| 2017/0076720 A1 | 3/2017 | Gopalan et al. |
| 2017/0092297 A1 | 3/2017 | Sainath et al. |
| 2017/0236512 A1 | 8/2017 | Williams et al. |

FOREIGN PATENT DOCUMENTS

| | | |
|---|---|---|
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2010141748 A | 6/2010 |
| JP | 2013037148 A | 2/2013 |
| JP | 2014071138 A | 4/2014 |
| JP | 2014137590 A | 7/2014 |
| WO | 200153994 | 7/2001 |
| WO | 03093950 A2 | 11/2003 |

(56) References Cited

FOREIGN PATENT DOCUMENTS

| | | |
|---|---|---|
| WO | 2015037396 A1 | 3/2015 |
| WO | 2015178950 A1 | 11/2015 |
| WO | 2017039632 A1 | 3/2017 |

OTHER PUBLICATIONS

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
Non-Final Office Action dated Dec. 12, 2016, issued in connection with U.S. Appl. No. 15/098,718, filed Apr. 14, 2016, 11 pages.
Non-Final Office Action dated Jan. 13, 2017, issued in connection with U.S. Appl. No. 15/098,805, filed Apr. 14, 2016, 11 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Corrected Notice of Allowability dated Mar. 8, 2017, issued in connection with U.S. Appl. No. 15/229,855, filed Aug. 5, 2016, 6 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated May 30, 2017, issued in connection with International Application No. PCT/US2017/018728, Filed on Feb. 21, 2017, 11 pages.
Non-Final Office Action dated Jun. 1, 2017, issued in connection with U.S. Appl. No. 15/223,218, filed Jul. 29, 2016, 7 pages.
Non-Final Office Action dated Feb. 7, 2017, issued in connection with U.S. Appl. No. 15/131,244, filed Apr. 18, 2016, 12 pages.
Non-Final Office Action dated Mar. 9, 2017, issued in connection with U.S. Appl. No. 15/098,760, filed Apr. 14, 2016, 13 pages.
Non-Final Office Action dated Apr. 19, 2017, issued in connection with U.S. Appl. No. 15/131,776, filed Apr. 18, 2016, 12 pages.
Non-Final Office Action dated Jan. 26, 2017, issued in connection with U.S. Appl. No. 15/098,867, filed Apr. 14, 2016, 16 pages.
Notice of Allowance dated Feb. 14, 2017, issued in connection with U.S. Appl. No. 15/229,855, filed Aug. 5, 2016, 11 pages.

* cited by examiner

DEFAULT PLAYBACK DEVICES

CROSS-REFERENCE TO RELATED APPLICATIONS

This application claims the benefit of priority under 35 USC §119(e) to U.S. Provisional Application Ser. No. 62/298,410 filed on Feb. 22, 2016 and entitled "DEFAULT PLAYBACK DEVICE(S)", U.S. Provisional Application Ser. No. 62/298,418 filed on Feb. 22, 2016 and entitled "AUDIO RESPONSE PLAYBACK", U.S. Provisional Application Ser. No. 62/298,433 filed on Feb. 22, 2016 and entitled "ROOM-CORRECTED VOICE DETECTION", U.S. Provisional Application Ser. No. 62/298,439 filed on Feb. 22, 2016 and entitled "CONTENT MIXING", U.S. Provisional Application Ser. No. 62/298,425 filed on Feb. 22, 2016 and entitled "MUSIC SERVICE SELECTION", U.S. Provisional Application Ser. No. 62/298,350 filed on Feb. 22, 2016 and entitled "METADATA EXCHANGE INVOLVING A NETWORKED PLAYBACK SYSTEM AND A NETWORKED MICROPHONE SYSTEM", U.S. Provisional Application Ser. No. 62/298,388 filed on Feb. 22, 2016 and entitled "HANDLING OF LOSS OF PAIRING BETWEEN NETWORKED DEVICES", U.S. Provisional Application Ser. No. 62/298,393 filed on Feb. 22, 2016 and entitled "ACTION BASED ON USER ID", U.S. Provisional Application Ser. No. 62/312,350 filed on Mar. 23, 2016 and entitled "VOICE CONTROL OF A MEDIA PLAYBACK SYSTEM", the contents each of which are herein incorporated by reference in their entireties.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
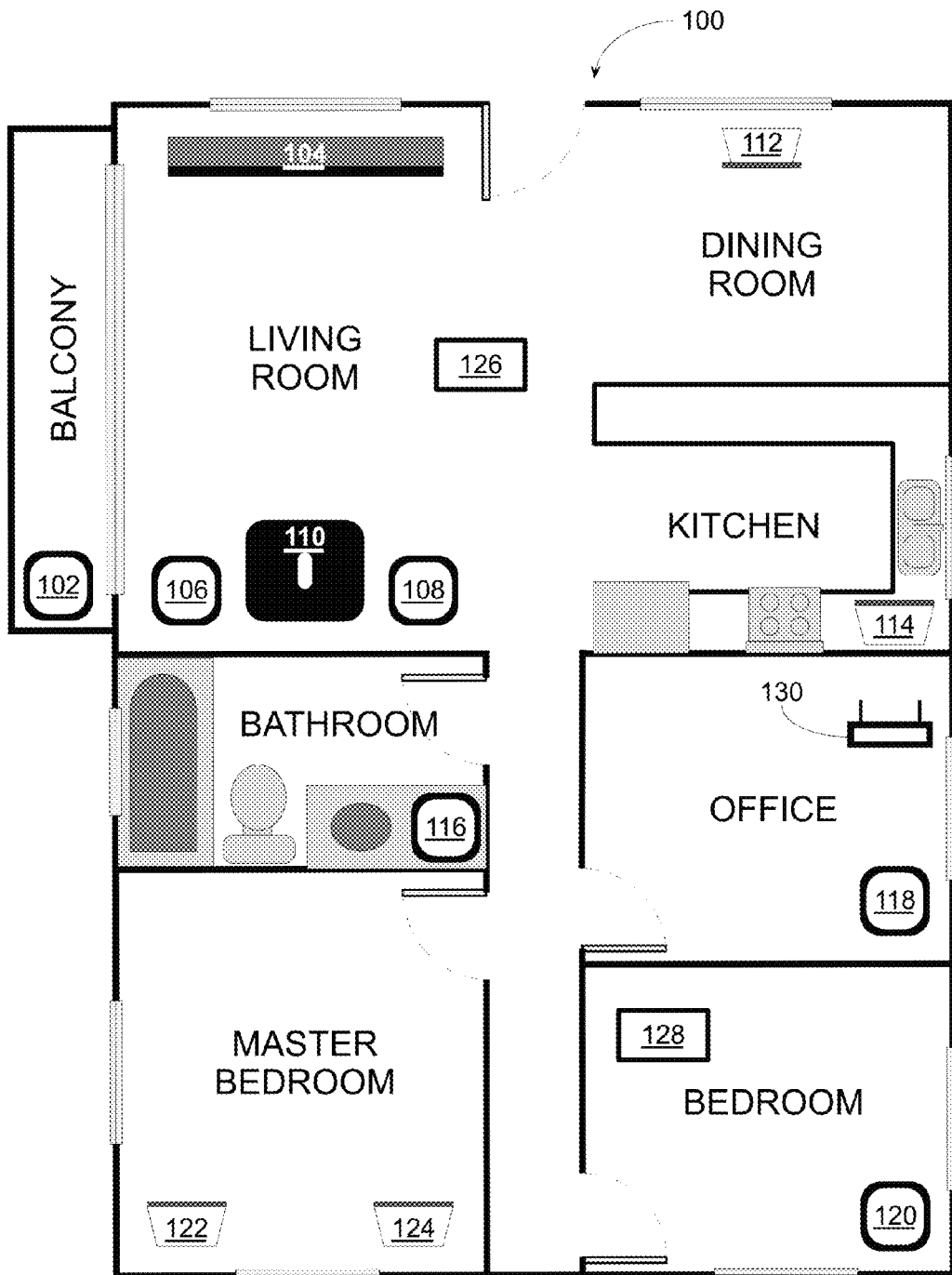
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve designating a default playback device in a media playback system and applying such designation of the default playback device. In one embodiment, a network microphone device ("NMD") may be assigned to a playback zone in a media playback system. In such a case, one or more of the playback devices in the playback zone may be designated as the default playback device for the NMD. Some examples herein involve methods and processes for designating the default playback device and/or assigning the NMD to a playback zone. Other examples involve methods and processes for causing the default playback device to take certain actions. In an embodiment, a command via the NMD to cause the media playback system to perform a particular playback command may not identify a specific playback zone. In such a case, the default playback device may be identified based on the assignment of the NMD to the playback zone of the default playback device. The default playback device may accordingly perform the particular playback command. Other scenarios and examples involving the designation of default playback devices and application of such designations can be found in the following sections.

As indicated above, the examples provided herein involve designating a default playback device in a media playback system and applying such designation of the default playback device. In one aspect, a method is provided. The method involves determining, by a computing device, that a networked microphone device is available for assignment to one or more playback zones within a local playback network, displaying by the computing device, a prompt to indicate at least one playback zone to which the network microphone device is to be assigned, receiving, by the computing device, an input indicating a particular playback zone in the local playback network to which the network microphone device is to be assigned, and storing, by the computing device, data indicating an assignment of the network microphone device to the particular playback zone.

In another aspect, a computing device is provided. The computing device includes a processor, and memory having stored thereon instructions executable by the processor to cause the device to perform functions. The functions include determining that a networked microphone device is available for assignment to one or more playback zones within a local playback network, displaying a prompt to indicate at least one playback zone to which the network microphone device is to be assigned, receiving an input indicating a particular playback zone in the local playback network to which the network microphone device is to be assigned, and storing data indicating an assignment of the network microphone device to the particular playback zone.

In yet another aspect, a non-transitory computer readable memory is provided. The non-transitory computer readable memory has stored thereon instructions executable by a computing device to cause the computing device to perform functions. The functions include determining that a networked microphone device is available for assignment to one or more playback zones within a local playback network, displaying a prompt to indicate at least one playback zone to which the network microphone device is to be assigned, receiving an input indicating a particular playback zone in the local playback network to which the network microphone device is to be assigned, and storing data indicating an assignment of the network microphone device to the particular playback zone.

In one aspect, a method is provided. The method maintaining, by a computing device, a database comprising data indicating an assignment of an identification of a network microphone device to a playback zone of a media playback system, receiving, by the computing device, a message indicating (i) the identification of the network microphone device and (ii) a media playback command, identifying, by the computing device the playback zone in the media playback system based on the data in the database and the received message, and transmitting, by the computing device to the playback zone, a message indicating the media playback command.

In another aspect, a computing device is provided. The computing device includes a processor, and memory having stored thereon instructions executable by the processor to cause the device to perform functions. The functions include maintaining a database comprising data indicating an assignment of an identification of a network microphone device to a playback zone of a media playback system, receiving a message indicating (i) the identification of the network microphone device and (ii) a media playback command, identifying the playback zone in the media playback system based on the data in the database and the received message, and transmitting to the playback zone, a message indicating the media playback command.

In yet another aspect, a non-transitory computer readable memory is provided. The non-transitory computer readable memory has stored thereon instructions executable by a computing device to cause the computing device to perform functions. The functions include maintaining a database comprising data indicating an assignment of an identification of a network microphone device to a playback zone of a media playback system, receiving a message indicating (i) the identification of the network microphone device and (ii) a media playback command, identifying the playback zone in the media playback system based on the data in the database and the received message, and transmitting to the playback zone, a message indicating the media playback command.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
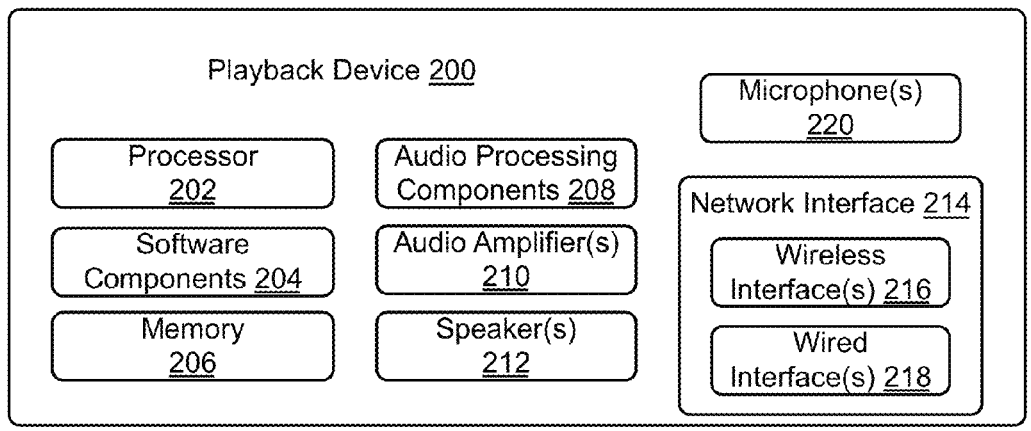
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audiovisual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices,"

which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
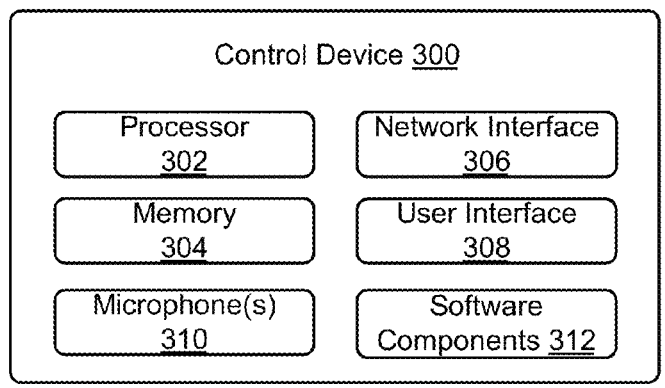
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
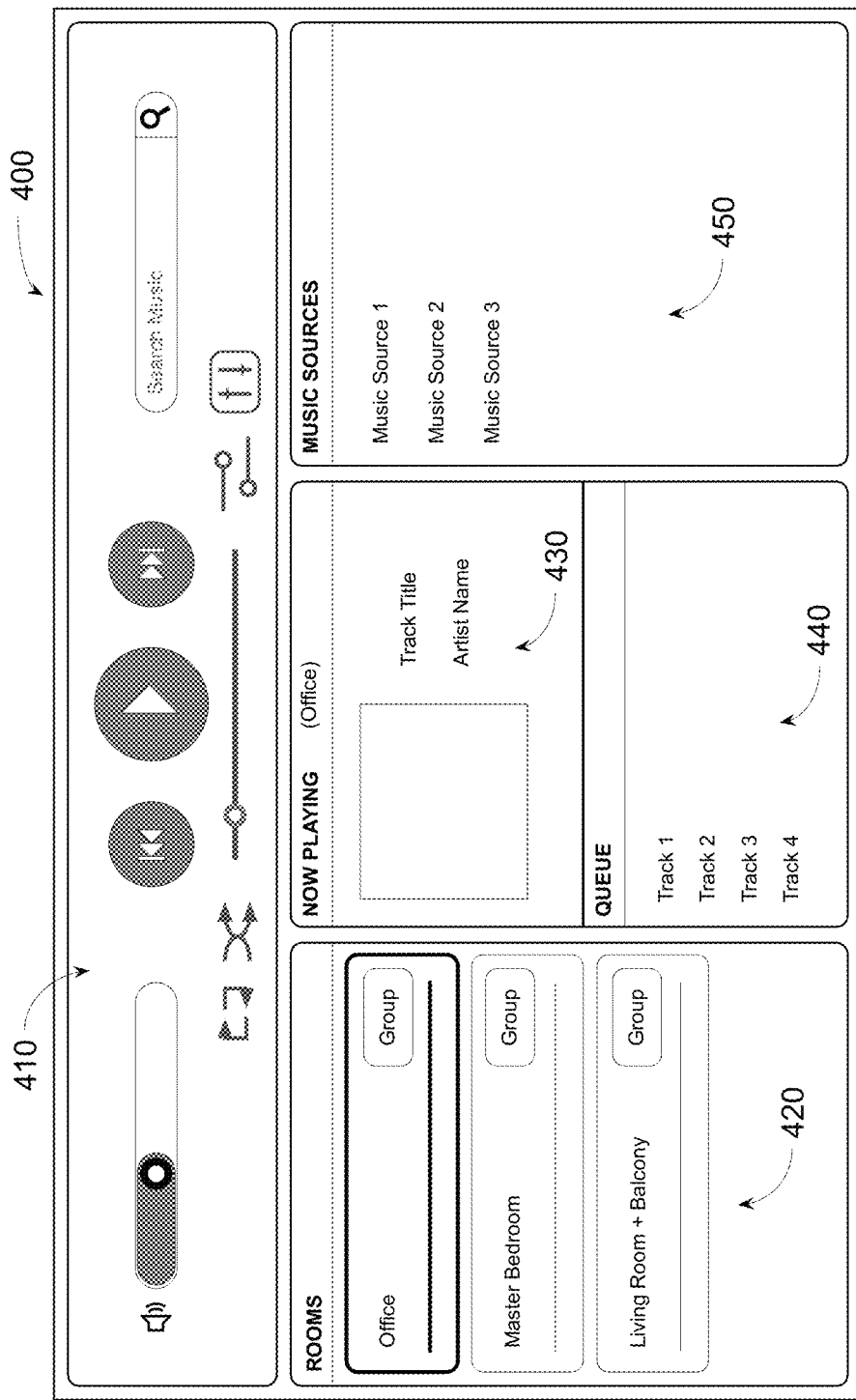
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
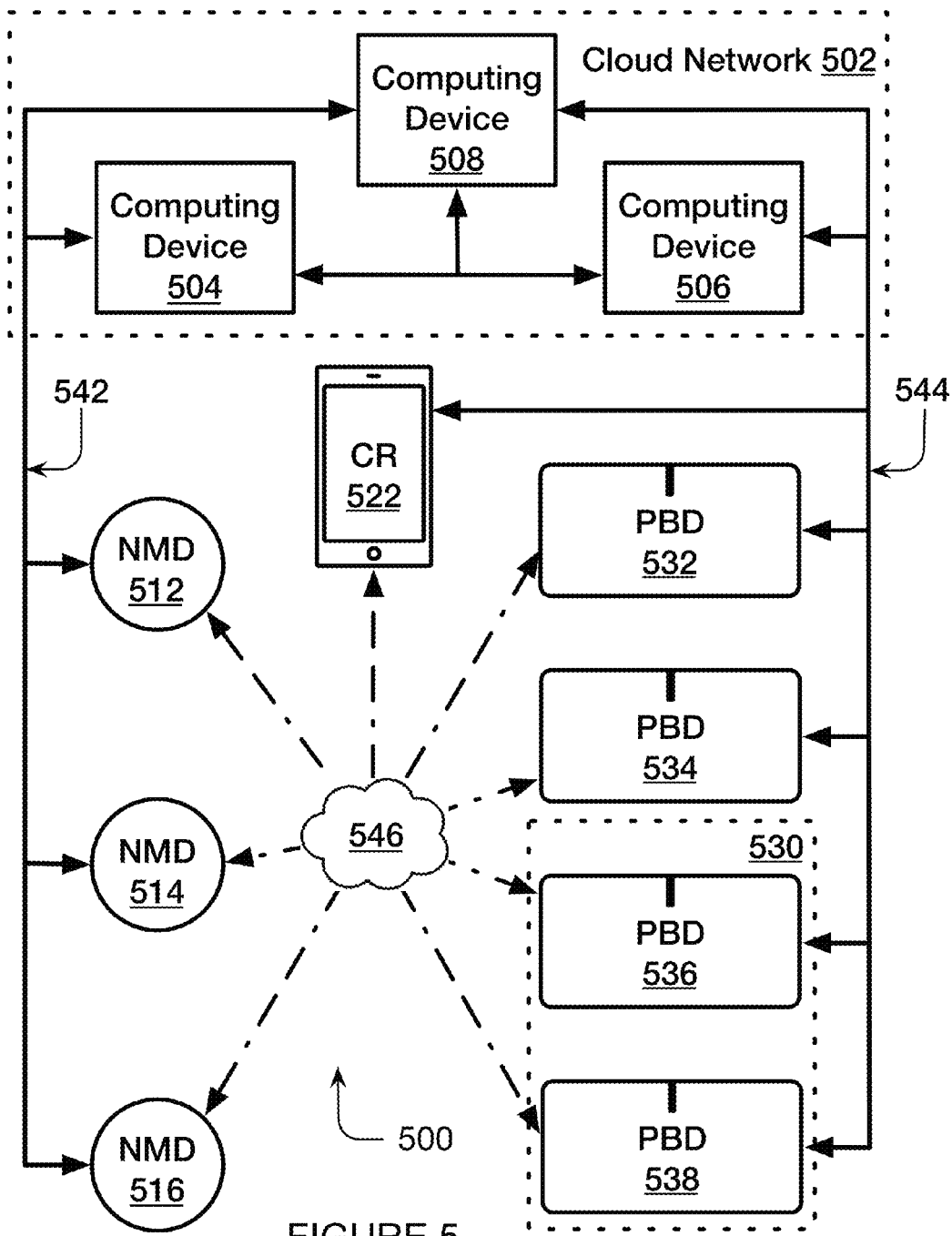
FIG. 5 shows an illustrative example of a plurality of network-capable devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™ (IEEE 802.15), and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
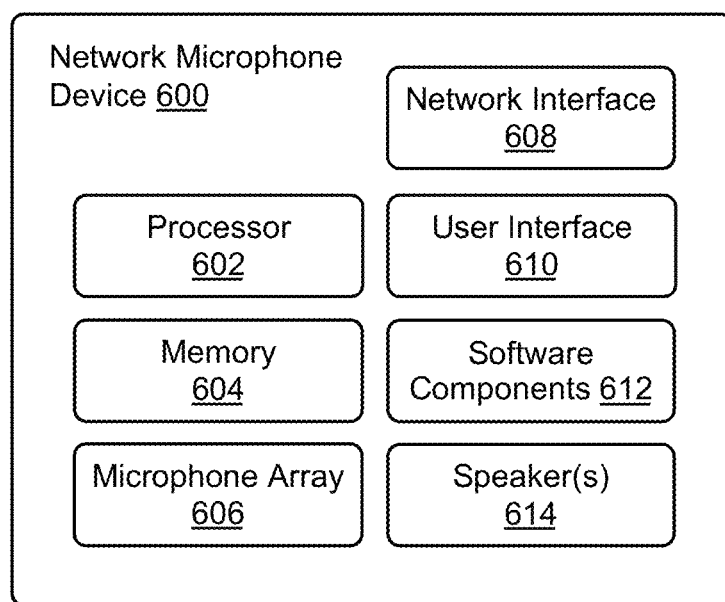
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614, or have a single microphone instead of a microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Default Playback Device(s)

Figure 7:
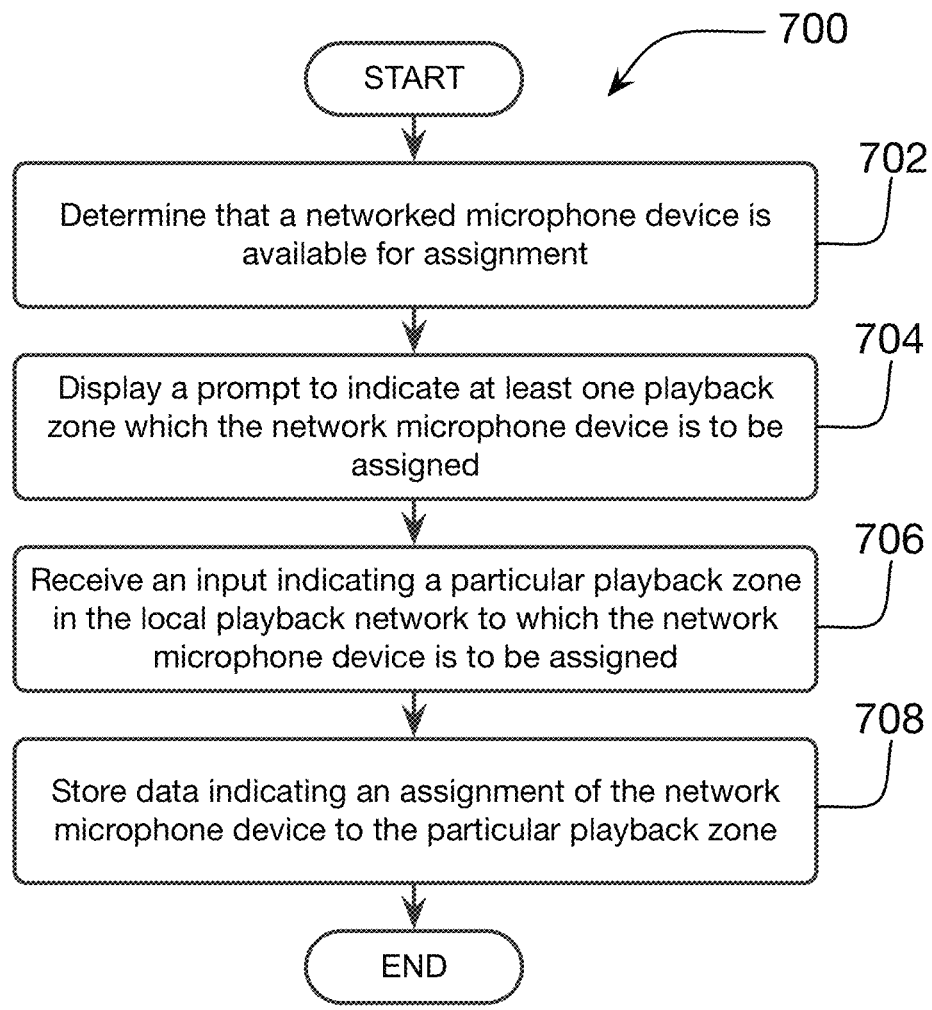
FIG. 7 shows an example flow diagram for designating default playback device(s)
Figure 9:
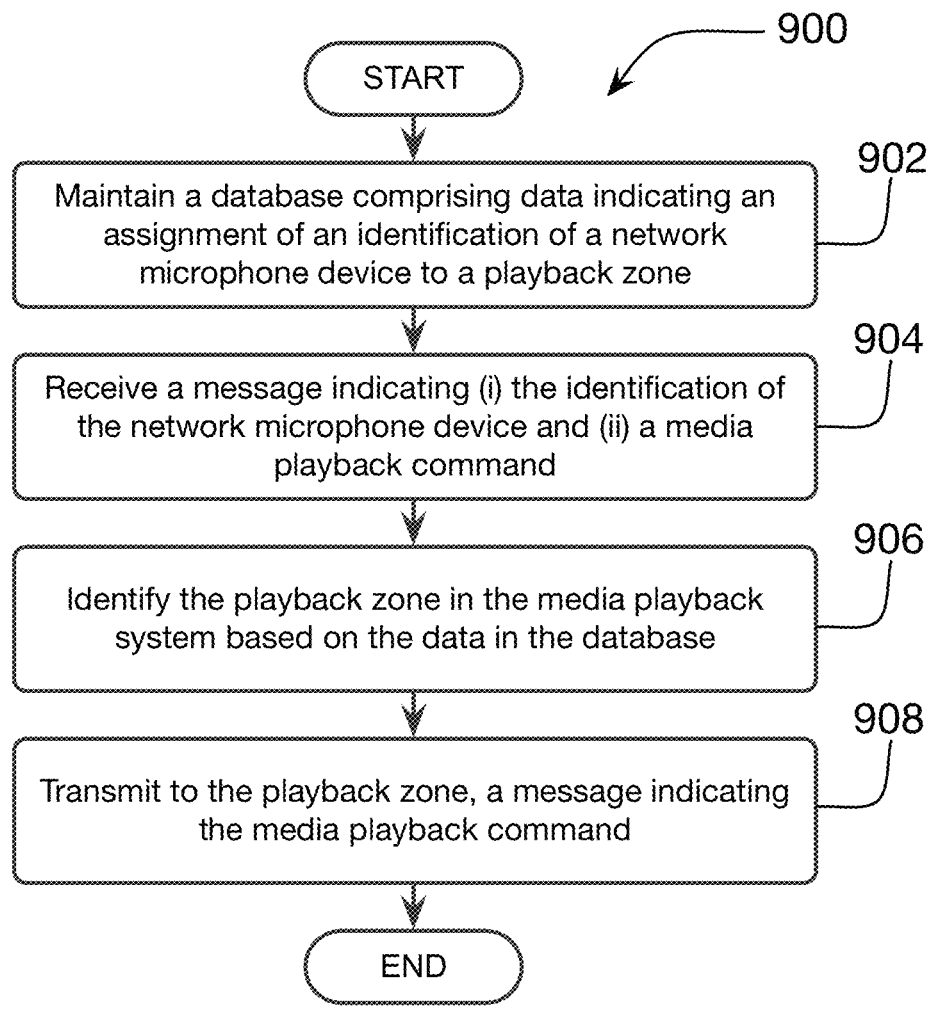
FIG. 9 shows an example flow diagram for applying default playback device designation(s).

As discussed above, embodiments described herein may involve designations of default playback devices in a media playback system, and application of such designations. FIG. 7 shows an example flow diagram 700 for designating default playback device(s), and FIG. 9 shows an example flow diagram 900 for applying default playback device designation(s). Methods 700 and 900 shown present embodiments of methods that can be implemented within an operating environment involving, for example, the media playback system 100 of FIG. 1, one or more of the playback device 200 of FIG. 2, one or more of the control device 300 of FIG. 3, and one or more of the plurality of devices of FIG. 5. Methods 700 and 900 may include one or more operations, functions, or actions as illustrated by one or more of blocks 702-708 and blocks 902-908, respectively. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for methods 700 and 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIGS. 6 and 7 may represent circuitry that is wired to perform the specific logical functions in the process.

a. Default Playback Device Designation(s)

Designation of default playback devices in a media playback system may involve assigning a network microphone device to one or more playback devices in the media playback system, such that the one or more playback devices become the designated default playback devices for functions associated with the network microphone device.

As shown in FIG. 7, the method 700 involves determining that a network microphone device is available for assignment at block 702, displaying a prompt to indicate at least one playback zone which the network microphone is to be assigned at block 704, receiving an input indicating a particular playback zone in the media playback system to which the network microphone device is to be assigned at block 706, and storing data indicating an assignment of the network microphone device to the particular playback zone at block 708.

For illustration purposes, method 700 may be performed by CR 522 of FIG. 5, which may be one of one or more controller devices configured to control a media playback system including one or more of PBDs 532, 534, 536, 538, or other playback devices. Nevertheless, one having ordinary skill in the art will appreciate that functions discussed in relation to method 700 may be additionally or alternatively wholly or partially performed, with or without applicable modifications, by one or more other devices in the plurality of devices 500 shown in FIG. 5.

In an example scenario of a user interacting with a computing device executing method 700, such as CR 522, the user of CR 522 may indicate that a network microphone device is to be assigned to one or more playback zones. In response to the indication by the user, CR 522 may determine whether one or more network microphone devices are available for assignment. In one case, the user may enter into CR 522 identification information for a network microphone device the user wishes to assign. In another case for which additional discussion is provided below, CR 522 may seek within communicative range of CR 522, network microphone devices that are available for assignment. In one instance, CR 522 may display a list of found network microphone devices, and prompt the user to select a network microphone device for assignment. Other examples are also possible.

At block 702, method 700 involves determining that a networked microphone device is available for assignment to one or more playback zones within a local playback network. In discussions herein, playback devices and controllers on the local playback network may form a media playback system such as that described in the sections above. For illustration purposes, the networked microphone device may be NMD 512 of FIG. 5. Determining that NMD 512 is available for assignment may involve determining that NMD 512 is capable of communication with the local playback network, either as a part of the local area network, or via a device in the local playback network. As discussed previously, CR 522, and PBDs 532, 534, 536, and 538 (also referred to herein as "household devices") may be configured to communicate with each other over a local playback network. As such, determining that NMD 512 is capable of communication with the local playback network may involve determining that NMD 512 is capable of communication with at least one of the household devices. In one case, one or more of the household devices may be configured to transmit and/or detect from others of the household devices, messages indicating a presence of the transmitting device on the local network. Such messages may be transmitted when the transmitting device is first powered up, periodically, and/or in response to requests from other devices. In this case, determining that NMD 512 is capable of communication with at least one of the household devices may involve receiving by one or more of the household devices from NMD 512 a message indicating a presence of NMD 512.

In one example, CR 522 may establish communication with NMD 512 over a second network different from the local playback network. For instance, NMD 512 may establish communication to a local area network (LAN) that CR 522 is also configured to communicate over, or establish communication with CR 522 over a personal area network (PAN). In one example, the LAN and/or PAN may be facilitated according to a Bluetooth™ (IEEE 802.15) wireless technology standard. In one case, upon establishing the connection over the second network, NMD 512 may transmit to CR 522, a message indicating that NMD 512 is available for assignment to one or more playback zones in the local playback network.

In another example, determining that NMD 512 is available for assignment may further involve NMD 512 joining the local playback network of the household devices. In one case, communication between CR 522 (or any other of the household devices) and NMD 512 may be established over a second network, as discussed previously. In this case, however, CR 522 may then transmit over the second network to NMD 512, data indicating parameters for joining the local playback network. Examples of parameters for joining the local playback network may include one or more of a service set identifier (SSID), network encryption type(s), network passwords, network authorization tokens, and network communication channel definitions, among other possibilities. In one instance, CR 522 may determine that NMD 512 is available for assignment after receiving from NMD 512, acknowledgment of receipt of the network parameters and/or a message indicating NMD 512 is available for assignment over the second network. In another instance, CR 522 may determine that NMD 512 is available for assignment after receiving a message from the NMD 512 over the local playback network. In this instance, the message from the NMD 512 over the local playback network may or may not explicitly indicate that NMD 512 is available for assignment because the communication between CR 522 and NMD 512 over the local playback network may be sufficient to indicate that NMD 512 is available for assignment.

As indicated previously, one or more of NMDs 512, 514, and 516 may be modules or subcomponents of one or more of the household devices CR 522, and PBDs 532, 534, 536, and 538. In such cases, continuing with the example above, CR 522 may determine that NMD 512 is available for assignment by identifying the presence of NMD 512 as a subcomponent of itself (in the case NMD 512 is a module of CR 522), or by determining that NMD 512 is a subcomponent of another one of the household devices. In one instance, if NMD 512 is a subcomponent of PBD 532, CR 522 may identify NMD 512 and determine that NMD 512 is available for assignment when CR 522 and PBD 532 establish communication (i.e. over the local playback network). Other examples are also possible.

Figure 8A:
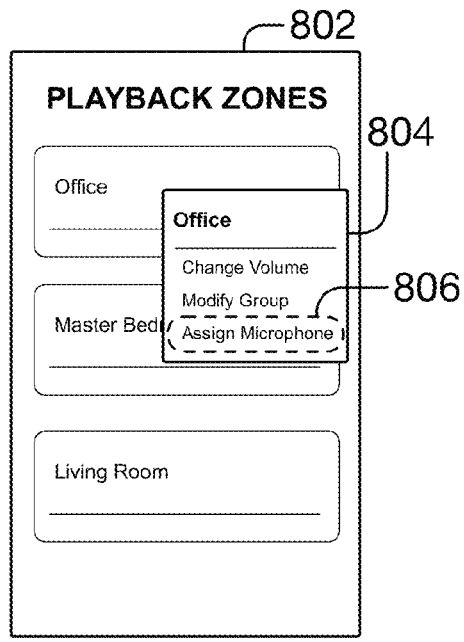
FIG. 8A-D show example user interfaces for assigning network microphone devices.

Once CR 522 determines that NMD 512 is available for assignment, CR 522 may provide an indication on a user interface of CR 522, that NMD 512 is available for assignment. For illustration purposes, FIG. 8A-D show example interfaces 802-862 that may be involved when assigning network microphone devices. Interface 802 of FIG. 8A shows a representations of playback zones in the local playback network. In one example, a selection (e.g. screen tap, force touch, and/or right click, etc.) of a representation corresponding a particular playback zone (in this case, the Office playback zone) may cause the interface to display a menu 804 (and/or a series of submenus) that provide representations of actions that can be performed on the selected playback zone. As shown, a selection 806 to "Assign Microphone" may be detected. In one example, interface 802 may be displayed and the selection 806 may be received prior to CR 522 determining that NMD 512 is available for assignment. In another example, interface 802 may be displayed and the selection 806 may be received after CR 522 has already determined that NMD 512 is available for assignment. In this case, the option to "Assign Microphone" may not be displayed in the menu 804, or may be grayed-out unless CR 522 has already determined that NMD 512, or at least one other network microphone device is available for assignment. Other examples are also possible.

Figure 8B:
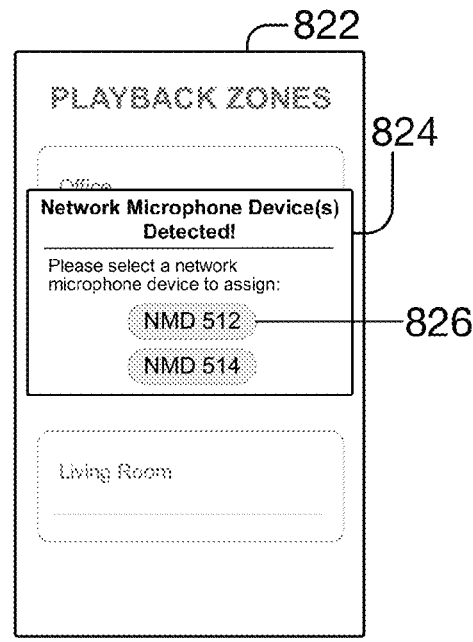

Interface 822 of FIG. 8B shows a message box 824 that indicates one or more network microphone devices have been detected (and available for assignment). The message box 824 may further include selectable representations of network microphone device that are available for assignment. For instance, representation 826 may be selectable to proceed with assigning NMD 512. In one example, interface 822 may be provided in response to the selection 806 of interface 802. In another example, interface 822 may be provided in response to CR 522 determining that NMD 512 (and in this example, NMD 514) are available for assignment. In one case, if interface 822 and message box 824 were provided in response to only a detection of one or more network microphone devices, and not from a prior input via the interface to assign a microphone (interface 802), the message box 824 may also include a selectable option (not shown) to assign the detected network microphone device(s) at a later time. Other examples are also possible.

At block 704, method 700 involves displaying a prompt to indicate at least one playback zone to which the network microphone device is to be assigned. In some cases, the at least one playback zone, may include two or more playback devices (such as the bonded zone 530 of FIG. 5, which includes PBDs 536 and 538). In such cases, CR 522 may also display a prompt to indicate at least one playback device within the at least one playback zone to which NMD 512 is to be assigned. In some other cases, CR 522 may not prompt a selection of a playback device within the at least one zone. In such cases, NMD 512 may be assigned to each playback device in the bonded zone, or by default, a group coordinator of the bonded zone. Other examples are also possible.

Figure 8C:
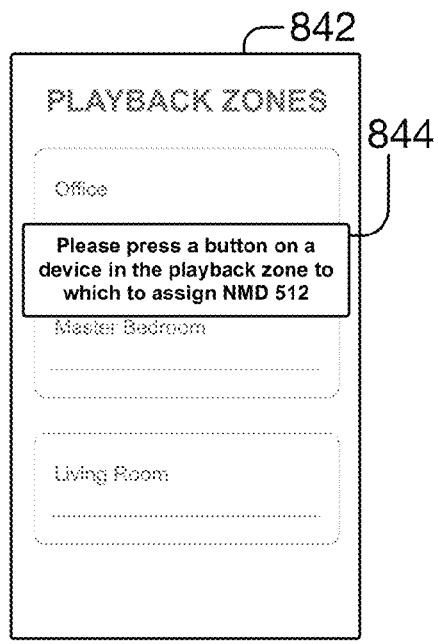

In one embodiment, the prompt to indicate at least one playback zone may involve prompting action physically related to the at least one playback zone. In one example, the prompt may be for the user to press a button on a playback device in the playback zone the user wishes to assign NMD 512 to. Interface 842 of FIG. 8C shows an example message box 844 to prompt the user to press a button on a playback device in the playback zone the user wishes to assign NMD 512. As indicated above, interface 842 may be provided in response to a selection of representation 826 on interface 822. In another example, the prompt may be for the user to tap CR 522 on a playback device in the playback zone the user wishes to assign NMD 512 to. In this case, the playback device may detect CR 522 over a near field communication (NFC) protocol.

In such examples where an action physically related to the at least one playback zone is involved, indication of the at least one playback device within the at least one playback zone to which NMD 512 is to be assigned may be inherent to the indication of the at least one playback zone. In other words, the playback device in the at least one playback zone on which the button press or CR 522 tap occurs may also be the playback device to which NMD 512 is to be assigned. Other examples are also possible.

Figure 8D:
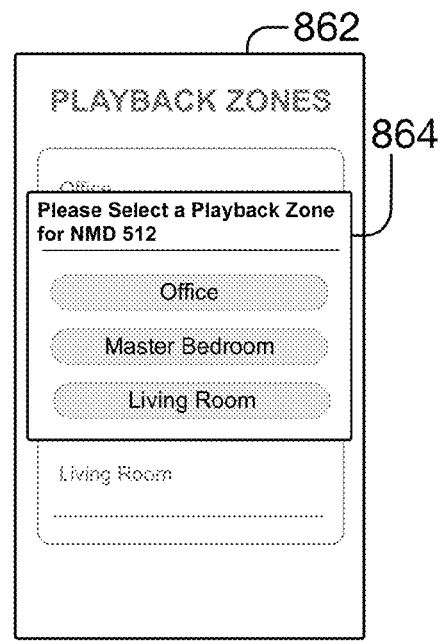

In another embodiment, the prompt to indicate at least one playback zone may involve prompting action on the user interface of CR 522. In one example, CR 522 may display on the interface, for each playback zone in the local playback network, a corresponding representation (similar to the playback zone region 420 of FIG. 4), and further display on the interface, a prompt to select a representation corresponding to the playback zone to which NMD 512 is to be assigned. Interface 862 of FIG. 8D shows an example message box 864 that includes selectable representations corresponding to the playback zones in the local playback network. As indicated above, interface 862 may be provided in response to a selection of representation 826 on interface 822. In this example, if the selected representation corresponds to a bonded playback zone, such as the bonded zone 530, CR 522 may further display on the interface, a prompt to indicate a particular playback device (i.e. PBDs 536 or 538) in the bonded playback zone. For instance, CR 522 may display on the interface a prompt to select a corresponding representation for each playback device in the selected playback zone.

In a further embodiment, the prompt to indicate at least one playback zone may involve some combination of the action physically related to the at least one playback zone, and the action on the user interface of CR 522. For instance, the prompt to indicate a playback zone to which NMD 512 is to be assigned may involve only action on the user interface of CR 522, but a subsequent prompt to indicate a playback device within the playback zone may involve actions physically related to the playback device to which NMD 512 is to be assigned. Other examples are also possible.

In yet a further embodiment, the prompt to indicate at least one playback zone may further include a suggested at least one playback zone. In one example, CR 522 may identify (i) that NMD 512 was given a name including "Master Bedroom," and (ii) that a playback zone in the local playback network has also been given the name "Master Bedroom," and accordingly include with, or add to the prompt to indicate at least one playback zone, a suggestion that the Master Bedroom playback zone may be a suitable playback zone to which NMD 512 may be assigned. Other examples are also possible.

At block 706, method 700 involves receiving an input indicating a particular playback zone in the local playback network to which the network microphone device is to be assigned. As suggested above, if the particular includes two or more playback devices, the input may further indicate a particular playback device in the particular playback zone.

In one embodiment, if the prompt displayed at block 704 involved an action physically related to the playback zone, the input indicating the particular playback zone may be received from a playback device in the particular playback zone. For instance, if a button on PBD 536 was pressed or a tap on PBD 536 by CR 522 was performed in response to the displayed prompt at block 704, PBD 536 may transmit a message to CR 522 indicating that PBD 536 and/or bonded zone 530 was selected.

In another embodiment, if the prompt displayed at block 704 involved an action on the interface of CR 522, the input indicating the particular playback zone may be received in the form of the selection input(s) by the user on the interface. Other examples are also possible.

At block 708, method 700 involves storing data indicating an assignment of the network microphone device to the particular playback zone. In one example, continuing with the examples above, storing the data indicating the assignment of NMD 512 to the bonded zone 530 may involve storing on a local memory storage of CR 522, the data indicating the assignment. In another example, storing the data indicating the assignment may involve transmitting to one or more of the other household devices, the data indicating the assignment and a message to cause the one or more of the other household devices to store the data. In yet another example, storing the data indicating the assignment may involve transmitting to a server, such as one or more of the computing device 504, 506, and 508 of cloud network 502, the data indicating the assignment and a message to cause the one or more of the computing device 504, 506, and 508 of cloud network 502 to store the data. Other examples re also possible.

As mentioned above, assignment of a network microphone device to a particular playback zone may also involve an assignment of the network microphone device to at least one playback device in the particular playback zone. As such, the data indicating the assignment of NMD 512 to the bonded zone 530 may include data indicating an assignment of NMD 512 to PBD 536, if continuing with the examples above. In some cases, if a playback device in a playback zone is not explicitly indicated, the network microphone device may be assigned to each playback device in the particular playback zone. In other cases, if a playback device in a playback zone is not explicitly indicated, a playback device in the particular playback zone may be automatically and/or intelligently identified, and the network microphone may be assigned to to the identified playback device. For instance, if the playback zone is a bonded zone, a coordinating playback device of the bonded zone may be identified. In another instance, if the playback zone is a zone group, a group coordinator playback device in the zone group may be identified. Other examples are also possible.

In one embodiment, the network microphone device that has been assigned may correspond to one or more unique identifiers. For instance, the network microphone device may have a unique serial number, or a corresponding MAC address, among other possibilities. Accordingly, storing data indicating the assignment of the NMD 512 to the bonded zone 530 (and/or PBD 536) may involve storing an assignment of the unique identifier of NMD 512 to the bonded zone 530 (and/or PBD 536).

In one example, CR 522 may receive a unique identifier for NMD 512 when initially determining that NMD 512 is available for assignment. In some cases, if the network microphone device did not provide a unique identifier, a unique identifier may be generated and assigned to the network microphone device. Other examples are also possible.

In some embodiments, a network microphone device may be assigned to two or more playback zones. For instance, in a household with an "open floor plan" such as that shown in FIG. 1, a network microphone device may be positioned somewhere within the vicinity of the Living Room, Dining Room, and Kitchen. In such cases, assignment of the network microphone device to two or more playback zones may be beneficial.

In one example, continuing with the examples above, CR 522 may display on the interface, a prompt to indicate a second playback zone to which NMD 512 is to be assigned, receive an input indicating a second playback zone in the media playback system, and storing data indicating an assignment of the network microphone device to the second playback zone such that the network microphone device is assigned to both the first playback zone and the second playback zone, similar to blocks 704-708.

In one example, interactions to assign NMD 512 to the second playback zone may be performed in series. For instance, CR 522 may display on the interface after receiving the input indicating that NMD 512 is to be assigned to bonded zone 530 at block 706, or after storing data indicating the assignment of NMD 512 to bonded zone 530, a prompt to indicate a second playback zone to which NMD 512 is to be assigned.

In another example, interactions to assign NMD 512 to the second playback zone may be performed substantially in parallel with the interactions to assign NMD 512 to the bonded zone 530. For instance, the prompt to indicate at least one playback zone at block 704 may be a prompt to indicate each playback zone to which NMD 512 is to be assigned. In this case, if the input received at block 706 indicates only a single playback zone, then the data stored at block 708 may indicate an assignment of NMD 512 to only the single playback zone. On the other hand, if the input received at block 706 indicates two or more playback zones, the data stored at block 708 may indicate an assignment of NMD 512 to each of the two or more playback zones.

In a further example, the prompt to indicate a playback zone may prompt the user to group together the two or more playback zones to which NMD 512 is to be assigned, such that the user can then select on the interface from among a representation of zones, a representation corresponding to the group (or alternatively, physically select a playback device in the zone group) to indicate that NMD 512 is to be assigned to the zone group and/or playback zones in the zone group. Other examples are also possible.

TABLE 1

| NMD | Playback Zone 1 | PBD in Zone 1 | Playback Zone 2 | PBD in Zone 2 |
| --- | --- | --- | --- | --- |
| NMD 512 | Master Bedroom | PBD 536 | n/a | n/a |
| NMD 514 | Living Room | PBD 534 | Kitchen | n/a |
| NMD 516 | Office | PBD 532 | Master Bedroom | PBD 536 PBD 538 |

For illustration purposes, Table 1 shows an example set of entries in a default playback device database. As shown, Table 1 lists each of the NMDs 512, 514, and 516, and the playback zone(s) and playback device(s) to which they are assigned. In this example, both NMD 512 and NMD 516 are assigned to the Master Bedroom playback zone (bonded zone 530). In this example however, NMD 512 is further assigned specifically to PBD 536 of the Master Bedroom playback zone, while NMD 516 is further assigned specifically to both PBD 536 and PBD 538. Further in this example, NMD 514 is assigned to both the Living Room playback zone and the Kitchen playback zone. However, NMD 514 is further assigned to PBD 534 in the Living Room playback zone, but not further assigned to any playback device in the Kitchen playback zone.

One having ordinary skill in the art will appreciate that different formatting, organization, and sets of parameters may also be possible to achieve similar functions as Table 1. In one example, two or more network microphone devices may be assigned to a single playback zone or playback device. In another example, each network microphone device may be assigned to three or more playback zones. In a further example, each network microphone device may be assigned to one or more playback devices, and not any playback zones. In yet another example, Table 1 may list each playback zone and/or playback device in the local playback network, of which perhaps not every listed playback zone(s) or playback device(s) has assigned thereto, one or more network microphone devices. Other examples are also possible.

While the above discussions may generally refer to assignments of one or more network microphone devices to one or more playback zones and/or playback devices, one having ordinary skill in the art will appreciate that such assignments and designations may be additionally or alternatively established according to other methods and/or protocols. For instance, one or more playback zones and/or playback devices may equivalently or alternatively be assigned to one or more network microphone devices, and corresponding data may be stored locally at the one or more network microphone devices or remotely at a server such as computing device 504. Continuing with the example of Table 1, entries in Table 1 may alternatively (or additionally) be provided based on assignments of PBD536 and/or the Master Bedroom playback zone to NMD 512 via an interface corresponding to at least NMD 512 (i.e. a controller interface for managing and controlling at least NMD 512). Similarly, the Office playback zone and the Master Bedroom playback zone may both be assigned to NMD 516 via the interface corresponding to at least NMD 512 and 516.

In addition, both forms of assignments and designations may co-exist such that the plurality of network microphone devices and the plurality of playback devices may be cross-assigned to each other. In such a case, the cross-assignments may or may not fully match. For instance, in some cases, a network microphone device may be assigned to two playback devices, but only one or neither of the playback devices are assigned to the network microphone. Other examples are also possible.

As indicated above, assignment of the network microphone device to the particular playback zone indicates that the particular playback zone is designated as a default playback zone for the network microphone device. The following section provides examples for applications of such a default playback zone designation.

b. Application of Default Playback Device Designation(s)

As shown in FIG. 9, the method 900 involves maintaining a database comprising data indicating an assignment of an identification of a network microphone device to a playback zone at block 902, receiving a message indicating (i) the identification of the network microphone device and (ii) a media playback command at block 904, identifying the playback zone in the media playback system based on the data in the database and the received message at block 906, and transmitting to the playback zone, a message indicating the playback command at block 908.

For illustration purposes, method 900 may be performed by computing device 506 of FIG. 5. Nevertheless, one having ordinary skill in the art will appreciate that functions discussed in relation to method 900 may be wholly or partially performed, with or without applicable modifications, by one or more other devices in the plurality of devices 500 shown in FIG. 5. For instance, the method 900 may be wholly or partially performed by the computing devices 504 and/or 508, or the cloud network 502.

At block 902, the method 900 involves maintaining a database comprising data indicating an assignment of an identification of a network microphone device to a playback zone of a media playback system. In one example, maintaining the database may involve functions similar to that described above in connection to method 700 of FIG. 7. In addition, maintaining the database may further involve updating the database in response to changes to the media playback system and/or local playback network. For instance, if a network microphone device has been reassigned to different playback zone(s) and/or playback device(s), the database may be updated. Likewise, if one or more devices, including network microphone devices such as NMDs 512, 514, and 516, playback devices such as PBDs 532, 534, 536, and 538, or control devices, such as CR 552 are added, removed, temporarily disconnected, or reconnected, the database may be updated accordingly. Other examples of maintaining the database are also possible.

At block 904, the method 900 involves receiving a message indicating (i) the identification of the network microphone device and (ii) a media playback command. Continuing with the examples above, computing device 506 may receive the message from the NMD 514.

In one example, computing device 506 may receive the message from NMD 514 via computing device 504. As discussed in connection to FIG. 5, NMD 514 may transmit a voice input to computing device 504 via communication path 542, and computing device 504 may convert the voice input to an equivalent text command, and subsequently transmit the text command to the computing device 506. In such a case, the message indicating (i) the identification of the network microphone device and (ii) the media playback command may include the text command from the computing device 504.

In another example, computing device 506 may receive the message directly from NMD 514. In such a case, the message may include data indicating the media playback command, while the source of the message identified in the message (i.e. within a data packet header/prefix of the message) may indicate NMD 514. In this case, the computing device 506 may also process and convert the voice input to an equivalent text command.

At block 906, the method 900 involves identifying the playback zone in the media playback system based on the data in the database and the received message. As also discussed in connection to FIG. 5, the computing device 506 may then parse the text command to identify one or more playback commands. During the parsing of the text command to identify one or more playback commands, the computing device 506 may identify a particular command, but may determine that a playback zone to perform the particular command was not identified. In one example, computing device 506 may determine that a playback zone to perform the particular command was not identified if no zone indication was provided in the playback command. In another example, computing device 506 may determine that a playback zone to perform the particular command was not identified if a zone indication that was provided in the playback command does not exist in the media playback system. Other examples are also possible.

Whichever the case, in response to the determining that the received message does not indicate a particular playback zone, computing device 906 may identify in the database, a playback zone in the media playback system based on the identification of the network microphone device in the received message. In other words, computing device 506 may identify a playback zone designated as the default playback zone of the network microphone device identified in the received message (and/or from which the media playback command originated.)

Continuing with the examples above, including Table 1, if the received message does not identify a valid playback zone but indicates NMD 512, then computing device 506 may identify the playback zone "Master Bedroom" and/or PBD 536 as the playback zone to perform the media playback command in the received message.

As shown in Table 1, in some cases, a network microphone device such as NMD 514 or 516 may be assigned to two or more playback zones (and/or playback devices). In one example, computing device 506 may identify each of the two or more playback zones as playback zones that are to perform the media playback command. For instance, if the received message indicates NMD 514, computing device 506 may identify both the Living Room and the Kitchen as playback zones that are to perform the media playback command.

In another example, computing device 506 may identify a subset of the two or more playback zones as playback zones that are to perform the media playback command. For instance, if the received message indicates NMD 516, computing device may identify one of the Office or the Master Bedroom as the playback zone that is to perform the media playback command. In some cases, computing device 506 may identify the subset based on additional information, such as contextual information.

In one case, computing device 506 may identify the subset of the two or more playback zones as playback zones that are to perform the media playback command based on media content associated with the two or more playback zones. For instance, if a first subset of the two or more playback zones is playing media content and/or is associated with media content (i.e. has media content in a corresponding playback queue) while a second subset of the two or more playback zones is not playing media content and/or is not associated with media content when the voice input was received at the corresponding network microphone device, computing device 506 may identify the first subset of the two or more playback zones as playback zones that are to perform the media playback command.

Additionally, computing device 506 may identify the subset of the two or more playback zones based on the media playback command and media playback states of the two or more playback zones. In such a case, the computing device 506 may be configured to receive and maintain playback states for each of the playback zones in the media playback system. For instance, if the media playback command involves pausing playback of media content while a first subset of the two or more playback zones is playing media content and a second subset of the two or more playback zones is not playing media content when the voice input was received by the corresponding network microphone device, then computing device 506 may identify the first subset of the two or more playback zones based on an assumption that a user is more likely to provide a pause command to a playback zone that is playing media content than a playback zone that is not playing media content (i.e. already paused).

In another case, the database (or another database) may be configured to also store information relating to media playback history within the media playback system and/or more specifically, media playback command history associated with each of the network microphone devices. For instance, data in the database may indicate that a subset of the two or more playback zones is more frequently used to play media content and/or more frequently used to play media content in response to a voice command via the corresponding network microphone device. In such a case, computing device 506 may identify the more frequently used subset of two or more playback zones as playback zones that are to perform the media playback command.

In a further case, the media playback history and/or media playback command history may further indicate a times of day, or days of week, etc. when a subset of the two or more playback zones is more frequently used to playback media content and/or more frequently used to play media content in response to a voice command. In such a case, computing device 506 may further identify the subset of two or more playback zones that are to perform the media playback command based on a time when the voice input was received at the corresponding network microphone device.

In yet another case, computing device 506 may identify the subset of the two or more playback zones as playback zones to perform the media playback command based further on proximity information available to the computing device 506. In other words, computing device 506 may identify the subset of the two or more playback zones based on a physical location of the user when providing the voice input to the corresponding network microphone device.

In one example, the voice input detected and processed by the network microphone device may contain directional information corresponding to the voice input. In one embodiment, during setup and assignment of the network microphone device to the two or more playback zones, the network microphone device may determine and store in memory (locally or remotely, i.e. computing device 504), locations of the two or more playback zones in relation to the network microphone device. For instance, during setup and assignment of the network microphone device, or over time, the network microphone device may detect playback of media content by the two or more playback zones, and correlate directions from which the playback of media content is detected with the corresponding playback zones. As such, the physical location of the user may be determined based on a direction from which the voice input was detected by the network microphone device.

In another example, as previously suggested, one or more other devices in the media playback system may also include network microphone devices and/or other sensors. Accordingly, a network of available sensors may be configured to determine proximity or locate (i.e. via triangulation, etc.) the user when the user provides the voice input to the corresponding network microphone device. In one case, if the user is holding, or has recently used a control device such as CR 522, a location of the user, or proximity between the user and the playback devices/playback zones may be determined based on a signal strength between the control device and the playback devices. Similarly, an audio magnitude of the voice input as detected by the other network microphone devices, or wireless signal interference caused by the user between the various devices may also be received and applied by computing device 506 to determine the physical location of the user when the voice input was detected, and accordingly identify the subset of the two or more playback zones as playback zones that are to perform the media playback command. Other examples are also possible.

At block 908, the method 900 involves transmitting to the playback zone, a message indicating the media playback command. As described previously, each playback zone in the media playback system includes at least one playback device. Accordingly, transmitting to the playback zone, the message indicating the media playback command may involve transmitting the message indicating the media playback command to the corresponding at least one playback device of the playback zone. Referring to Table 1 and FIG. 5, the Office playback zone includes just PBD 532. In this case, transmitting a message indicating the media playback command to the Office playback zone may involve computing device 506 transmitting the message indicating the media playback command to PBD 532.

Referring again to Table 1 and FIG. 5, the bonded zone 530 (Master Bedroom) includes both PBDs 536 and 538. In one such case, computing device 506 may transmit the message indicating the media playback command to both PBDs 536 and 538. In another such case, computing device 506 may transmit the message indicating the media playback command to only one of the playback devices in the playback zone.

In one instance, the computing device 506 may select one of the PBDs 536 and 538 according to the database. For example, if the media playback command originated from NMD 512, and computing device 506 is transmitting the message indicating the media playback command to the Master Bedroom playback zone, computing device 506 may transmit the message indicating the media playback command to PBD 536 because NMD 512 is further assigned to PBD 536, but not to PBD 538.

In another example, if the media playback command originated from NMD 516, and computing device 506 is transmitting the message indicating the media playback command to the Master Bedroom playback zone, computing device 506 may select one of PBD 536 or PBD 538 based on additional information because NMD 516 has been assigned to both PBD 536 and PBD 538 as part of an assignment to the Master Bedroom playback zone. In one case, computing device 506 may select one of PBD 536 or PBD 538 based on one or more factors, such as device processing power and network conditions, among other possibilities. Additionally, or alternatively, computing device 506 may select one of PBD 536 or PBD 538 based on one of the playback devices being a coordinator for the bonded zone. Other examples are also possible.

In another case, as previously discussed, computing device 506 may identify two or more playback zones as playback zones that are to perform the media playback command. In such a case, computing device 506 may transmit the message indicating the media playback command to each playback device in each of the two or more playback zones, a subset of the playback devices in each of the two or more playback zones, or some combination thereof.

Further, in a case where all or at least a subset of the two or more playback zones identified as playback zones that are to perform the media playback command are grouped in a zone group, computing device 506 may identify a single playback device in the zone group to transmit the message indicating the media playback command, rather than transmitting the message to a playback device in each playback zone. In this case, computing device 506 may select a playback device from the zone group based on one or more factors, such as device processing power and network condition, among other possibilities. Additionally, or alternatively, computing device 506 may select a playback device from the zone group based on the playback device being a group coordinator for the zone group. Other examples are also possible.

In one embodiment, after transmitting the message indicating the media playback command to the playback zone(s), computing device 506 may further transmit to the computing device 504 and/or the network microphone device, a message indicating the playback command was sent for execution in the playback zone. In one example, the computing device 506 may receive from at least one playback device in the playback zone, a message indicating that the playback zone is executing the playback command prior to transmitting to the network microphone device, the message indicating the playback command was sent for execution in the playback zone.

In one case, computing device 506 may transmit the message indicating the playback command was sent for execution in the playback zone directly to the network microphone device. In another case, computing device 506 may transmit the message indicating the playback command was sent for execution in the playback zone to the network microphone device via another computing device, such as computing device 504 within cloud network 502.

In yet another case, computing device 506 may transmit the message indicating the playback command was sent for execution in the playback zone to the network microphone device via a playback device in the media playback system. For instance, computing device 506 may transmit the message indicating that the playback command was sent for execution to PMD 536 via communication path 544, and PMD 536 may relay the message to NMD 512 via local communications means 546.

The playback device relaying the message indicating the playback command was sent for execution may be a playback device executing the media playback command. For instance, the computing device 506, when transmitting to the playback zone, the message indicating the media playback command, may further cause a playback device in the identified playback zone to transmit to the corresponding network microphone device, upon receiving the message indicating the media playback command, a message indicating that the media playback command was sent for execution.

Additionally, or alternatively, the computing device 506 may determine that the media playback command has been executed, or is being executed, and responsively transmit to computing device 504 and/or the network microphone device, either directly or via another device, a message indicating that the media playback command has been executed or is being executed.

Further, the computing device 506, when transmitting to the playback zone, the message indicating the media playback command, may further cause a playback device in the identified playback one to transmit to the corresponding network microphone device, upon completing execution or during execution of the media playback command, a message indicating that the media playback command has been executed or is being executed. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein involve designating a default playback device in a media playback system and applying such designation of the default playback device. In one aspect, a method is provided. The method involves determining, by a computing device, that a networked microphone device is available for assignment to one or more playback zones within a local playback network, displaying by the computing device, a prompt to indicate at least one playback zone to which the network microphone device is to be assigned, receiving, by the computing device, an input indicating a particular playback zone in the local playback network to which the network microphone device is to be assigned, and storing, by the computing device, data indicating an assignment of the network microphone device to the particular playback zone.

In another aspect, a computing device is provided. The computing device includes a processor, and memory having stored thereon instructions executable by the processor to cause the device to perform functions. The functions include determining that a networked microphone device is available for assignment to one or more playback zones within a local playback network, displaying a prompt to indicate at least one playback zone to which the network microphone device is to be assigned, receiving an input indicating a particular playback zone in the local playback network to which the network microphone device is to be assigned, and storing data indicating an assignment of the network microphone device to the particular playback zone.

In yet another aspect, a non-transitory computer readable memory is provided. The non-transitory computer readable memory has stored thereon instructions executable by a computing device to cause the computing device to perform functions. The functions include determining that a networked microphone device is available for assignment to one or more playback zones within a local playback network, displaying a prompt to indicate at least one playback zone to which the network microphone device is to be assigned, receiving an input indicating a particular playback zone in the local playback network to which the network microphone device is to be assigned, and storing data indicating an assignment of the network microphone device to the particular playback zone.

In one aspect, a method is provided. The method maintaining, by a computing device, a database comprising data indicating an assignment of an identification of a network microphone device to a playback zone of a media playback system, receiving, by the computing device, a message indicating (i) the identification of the network microphone device and (ii) a media playback command, identifying, by the computing device the playback zone in the media playback system based on the data in the database and the received message, and transmitting, by the computing device to the playback zone, a message indicating the media playback command.

In another aspect, a computing device is provided. The computing device includes a processor, and memory having stored thereon instructions executable by the processor to cause the device to perform functions. The functions include maintaining a database comprising data indicating an assignment of an identification of a network microphone device to a playback zone of a media playback system, receiving a message indicating (i) the identification of the network microphone device and (ii) a media playback command, identifying the playback zone in the media playback system based on the data in the database and the received message, and transmitting to the playback zone, a message indicating the media playback command.

In yet another aspect, a non-transitory computer readable memory is provided. The non-transitory computer readable memory has stored thereon instructions executable by a computing device to cause the computing device to perform functions. The functions include maintaining a database comprising data indicating an assignment of an identification of a network microphone device to a playback zone of a media playback system, receiving a message indicating (i) the identification of the network microphone device and (ii) a media playback command, identifying the playback zone in the media playback system based on the data in the database and the received message, and transmitting to the playback zone, a message indicating the media playback command.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A computing device comprising:
a processor; and
memory having stored thereon instructions executable by the computing device to perform functions comprising:
   maintaining a database comprising data indicating an assignment of an identification of a network microphone device to a particular playback zone of a media playback system, wherein the particular playback zone comprises at least one playback device;
   receiving from the network microphone device, data indicating a voice input comprising
   a media playback command;
   determining that the voice input does not comprise an indication of any playback zone in the media playback system;
   in response to determining that the voice input does not comprise an indication of any playback zone in the media playback system, identifying in the maintained database, the particular playback zone in the media playback system based on the data indicating the assignment of the identification of the network microphone device to the particular playback zone; and
   after identifying the particular playback zone, transmitting to the at least one playback device of the particular playback zone, a message indicating the media playback command to cause the at least one playback device of the particular playback zone to execute the media playback command.

2. The computing device of claim 1, wherein the particular playback zone comprises two or more playback devices, and wherein transmitting to the at least one playback device of the particular playback zone, a message indicating the media playback command comprises:
   transmitting to each of the two or more playback devices, the message indicating the media playback command.

3. The computing device of claim 1, wherein the particular playback zone comprises two or more playback devices, and wherein transmitting to the at least one playback device of the particular playback zone, a message indicating the media playback command comprises:
  selecting one of the two or more playback devices; and
  transmitting to the selected playback device, the message indicating the media playback command.

4. The computing device of claim 1, wherein the particular playback zone is a first playback zone, wherein the database further comprises data indicating an assignment of the identification of the network microphone device to a second playback zone of the media playback system, and wherein identifying the first playback zone in the media playback system comprises:
  identifying in the maintained database, both the first playback zone and the second playback zone based on the data in the database; and
  wherein transmitting to the at least one playback device associated with the playback zone, the message indicating the media playback command comprises:
  selecting the first playback zone based on the data indicating the voice input; and
  based on the selection of the first playback zone, transmitting to the at least one playback device of the first playback zone, the message indicating the media playback command.

5. The computing device of claim 4, wherein the data indicating the voice input further indicates proximity information corresponding to the voice input, and wherein selecting the first playback zone in the media playback system comprises:
  selecting the first playback zone based the proximity information.

6. The computing device of claim 4,
  wherein selecting the first playback zone in the media playback system comprises:
    selecting the first playback zone based on a determination that the first playback zone is associated with media content.

7. The computing device of claim 4, wherein selecting the first playback zone comprises:
  selecting the first playback zone based on a determination that the second playback zone is not associated with media content.

8. The computing device of claim 1, wherein the functions further comprise:
  transmitting to the network microphone device, a message indicating the media playback command was sent to the at least one playback device in the particular playback zone.

9. The computing device of claim 8, wherein the functions further comprise:
  prior to transmitting to the network microphone device, the message indicating the media playback command was sent to the at least one playback device in the particular playback zone, receiving from the at least one playback device in the playback zone, a message indicating receipt of the media playback command.

10. The computing device of claim 8, wherein the computing device is a first server, and
  wherein transmitting to the network microphone device, the message indicating the media playback command was sent to the at least one playback device in the particular playback zone comprises:
    transmitting the message via a second server.

11. The computing device of claim 8, wherein transmitting to the network microphone device, a message indicating the media playback command was sent to the at least one playback device in the particular playback zone comprises:
  causing the at least one playback device in the playback zone to transmit to the network microphone device, the message indicating that the media playback command was received by the
  at least one playback device of the particular playback zone.

12. A method comprising:
  maintaining, by a computing device, a database comprising data indicating an assignment of an identification of a network microphone device to a particular playback zone of a media playback system, wherein the particular playback zone comprises at least one playback device;
  receiving by the computing device from the network microphone device, data indicating a voice input comprising media playback command;
  determining by the computing device that the voice input does not comprise an indication of any playback zone in the media playback system;
  in response to determining that the voice input does not comprise an indication of any playback zone in the media playback system, identifying by the computing device in the maintained database, the particular playback zone in the media playback system based on the data indicating the assignment of the identification of the network microphone device to the particular playback zone; and
  after identifying the particular playback zone, transmitting by the computing device to the at least one playback device of the particular playback zone, a message indicating the media playback command to cause the at least one playback device of the particular playback zone to execute the media playback command.

13. The method of claim 12, wherein the particular playback zone is a first playback zone; wherein the database further comprises data indicating an assignment of the identification of the network microphone device to a second playback zone of the media playback system; and wherein identifying the first playback zone in the media playback system comprises:
  identifying, by the computing device, the first playback zone and the second playback zone based on the data in the database; and
  selecting, by the computing device, the first playback zone out of the first playback zone and the second playback zone based on a determination that the first playback zone is associated with media content.

14. The method of claim 12, wherein the particular playback zone is a first playback zone; wherein the database further comprises data indicating an assignment of the identification of the network microphone device to a second playback zone of the media playback system; and wherein identifying the first playback zone in the media playback system comprises:
  identifying, by the computing device, the first playback zone and the second playback zone based on the data in the database; and
  selecting by the computing device, the first playback zone out of the first playback zone and the second playback zone based on a determination that the second playback zone is not associated with media content.

15. The method of claim 12, wherein the particular playback zone is a first playback zone; wherein the database further comprises data indicating an assignment of the identification of the network microphone device to a second playback zone of the media playback system; wherein the data indicating the voice input further indicates proximity information corresponding to the voice input; and wherein identifying the first playback zone in the media playback system comprises:

identifying by the computing device, the first playback zone further based on the proximity information.

16. The method of claim 12, further comprising:

transmitting, by the computing device to the network microphone device, a message indicating the media playback command was sent to the at least one playback device in the particular playback zone.

17. A non-transitory computer readable storage medium including instructions for execution by a processor, the instructions, when executed, cause the processor to implement a method comprising:

maintaining a database comprising data indicating an assignment of an identification of a network microphone device to a particular playback zone of a media playback system, wherein the particular playback zone comprises at least one playback device;

receiving from the network microphone device, data indicating a voice input comprising a media playback command;

determining that the voice input does not comprise an indication of any playback zone in the media playback system;

in response to determining that the voice input does not comprise an indication of any playback zone in the media playback system, identifying in the maintained database, the particular playback zone in the media playback system based on the data indicating the assignment of the identification of the network microphone device to the playback zone; and after identifying the playback zone, transmitting to the at least one playback device of the particular playback zone, a message indicating the media playback command to cause the at least one playback device of the particular playback zone to execute the media playback command.

18. The non-transitory computer readable storage medium of claim 17, wherein the particular playback zone is a first playback zone; wherein the database further comprises data indicating an assignment of the identification of the network microphone device to a second playback zone of the media playback system; and wherein identifying the first playback zone in the media playback system comprises:

identifying the first playback zone and the second playback zone based on the data in the database; and selecting the first playback zone from the first playback zone and second playback zone based on a determination that the first playback zone is associated with media content.

19. The non-transitory computer readable storage medium of claim 17, wherein the particular playback zone is a first playback zone; wherein the database further comprises data indicating an assignment of the identification of the network microphone device to a second playback zone of the media playback system; wherein the data indicating the voice input further indicates proximity information corresponding to the voice input; and wherein identifying the first playback zone in the media playback system comprises:

identifying the first playback zone further based on the proximity information.

20. The non-transitory computer readable storage medium of claim 17, further comprising instructions for:

transmitting to the network microphone device, a message indicating the media playback command was sent to the at least one playback device in the particular playback zone.

* * * * *